United States Patent
Zhang et al.

(10) Patent No.: US 11,872,903 B2
(45) Date of Patent: Jan. 16, 2024

(54) SYSTEM AND METHOD FOR RECALIBRATING A TRACTION BATTERY THROUGH BI-DIRECTIONAL POWER TRANSFER

(71) Applicant: Ford Global Technologies, LLC, Dearborn, MI (US)

(72) Inventors: Yuan Zhang, Canton, MI (US); Rui Wang, Canton, MI (US); Xu Wang, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 17/169,107

(22) Filed: Feb. 5, 2021

(65) Prior Publication Data

US 2022/0250497 A1    Aug. 11, 2022

(51) Int. Cl.
| | |
|---|---|
| *H02J 7/00* | (2006.01) |
| *B60L 53/62* | (2019.01) |
| *B60L 50/60* | (2019.01) |
| *B60L 58/12* | (2019.01) |
| *B60L 53/50* | (2019.01) |
| *H02J 7/04* | (2006.01) |
| *B60L 53/66* | (2019.01) |
| *H02J 50/10* | (2016.01) |
| *B60L 53/64* | (2019.01) |

(52) U.S. Cl.
CPC ............... *B60L 53/62* (2019.02); *B60L 50/60* (2019.02); *B60L 53/50* (2019.02); *B60L 58/12* (2019.02); *H02J 7/00032* (2020.01); *H02J 7/0071* (2020.01); *H02J 7/04* (2013.01); *B60L 53/64* (2019.02); *B60L 53/66* (2019.02); *H02J 50/10* (2016.02); *H02J 2207/20* (2020.01)

(58) Field of Classification Search
CPC .......... B60L 53/50; B60L 53/62; B60L 53/64; B60L 53/66; B60L 50/60; B60L 58/12; H02J 7/0071; H02J 7/04; H02J 7/00032; H02J 50/10; H02J 2207/20
USPC .......................... 320/104, 108–109; 701/22
See application file for complete search history.

(56) References Cited

U.S. PATENT DOCUMENTS

| | | | |
|---|---|---|---|
| 5,596,261 A | 1/1997 | Suyama | |
| 8,558,504 B2 | 10/2013 | Brown et al. | |
| 9,172,118 B2 | 10/2015 | Marsh et al. | |
| 10,414,283 B2 | 9/2019 | Kudo et al. | |
| 10,693,294 B2 | 6/2020 | Kearns et al. | |
| 2011/0204720 A1* | 8/2011 | Ruiz | B60L 53/305 |
| | | | 307/66 |
| 2013/0024055 A1* | 1/2013 | Hysko, Jr. | B60L 58/15 |
| | | | 180/65.265 |
| 2013/0179061 A1* | 7/2013 | Gadh | B60L 53/63 |
| | | | 701/1 |
| 2017/0050529 A1 | 2/2017 | Lambert et al. | |
| 2020/0231057 A1 | 7/2020 | Hishida et al. | |
| 2020/0353839 A1* | 11/2020 | Tarchinski | B60L 58/12 |

* cited by examiner

*Primary Examiner* — Zixuan Zhou
(74) *Attorney, Agent, or Firm* — David Kelley; McCoy Russell LLP (57) ABSTRACT

Methods and system are described for recalibrating a charge storage capacity value of an electric energy storage device. In one example, the charge electric energy storage device may be a battery. The charge storage capacity value may be recalibrated via discharging and charging a battery via electric vehicle supply equipment.

17 Claims, 4 Drawing Sheets

SYSTEM AND METHOD FOR RECALIBRATING A TRACTION BATTERY THROUGH BI-DIRECTIONAL POWER TRANSFER

FIELD

The present description relates generally to methods and systems for recalibrating a traction battery electric charge capacity value. The traction battery electric charge capacity value may be used to determine vehicle driving range, battery state of charge, and battery state of health.

BACKGROUND/SUMMARY

A traction battery may start its life with a first traction battery electric charge capacity value. As the traction battery ages and is used, the first traction battery electric charge capacity value may no longer be appropriate. The first traction battery electric charge capacity value may be replaced with a second traction battery electric charge capacity value; however, it may be desirable for the second traction battery electric charge capacity value to be accurate so that estimates of vehicle driving range, battery state of charge, and battery state of health may also be accurate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
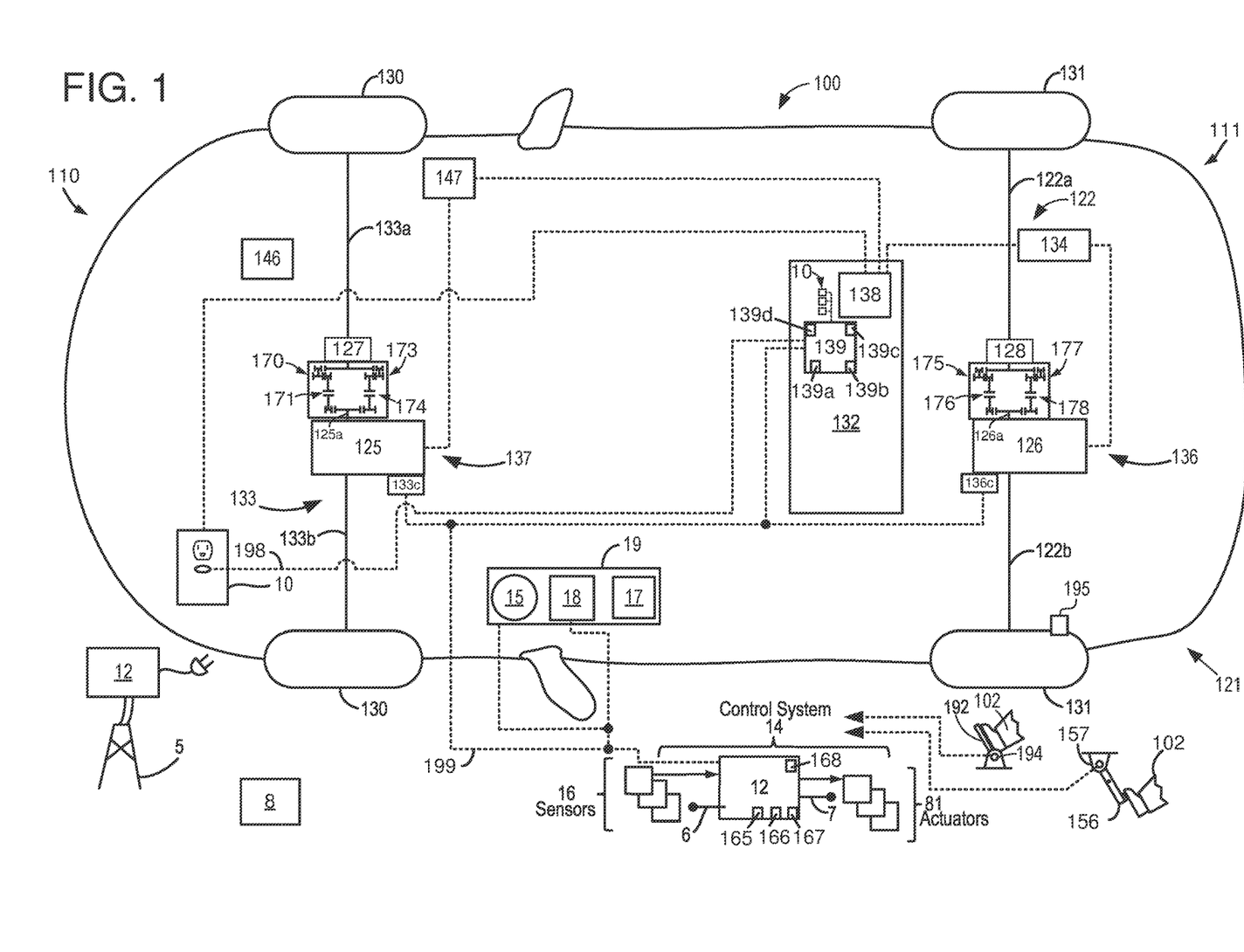
FIG. 1 is a schematic diagram of a vehicle driveline is shown.
Figure 2:
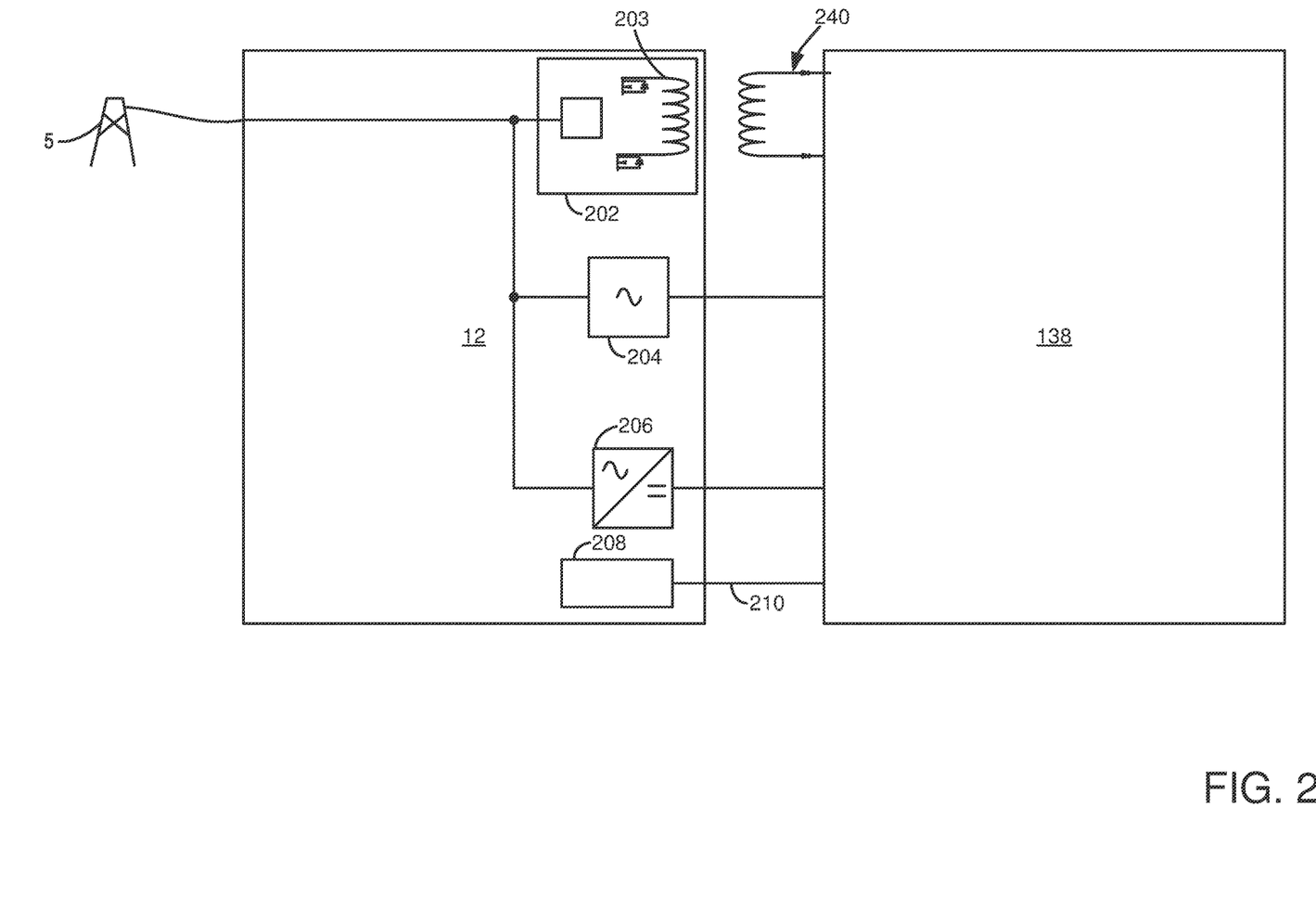
FIG. 2 shows a schematic diagram of different ways that a traction battery may be discharged and charged via electric vehicle supply equipment (EVSE)
Figure 3:
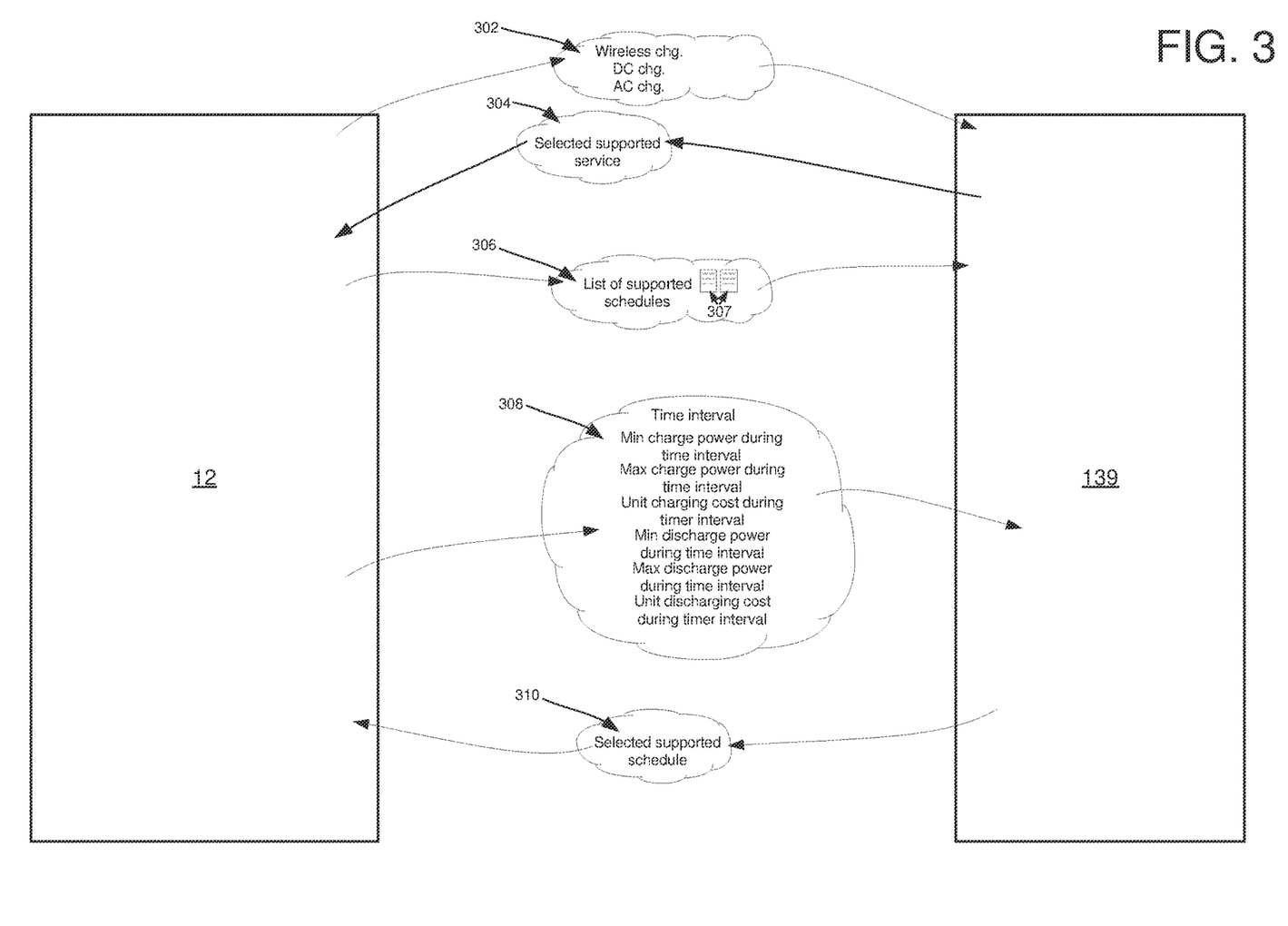
FIG. 3 shows a graphic representation of example data transferred during communications handshaking between EVSE and a battery management system (BMS)
Figure 4:
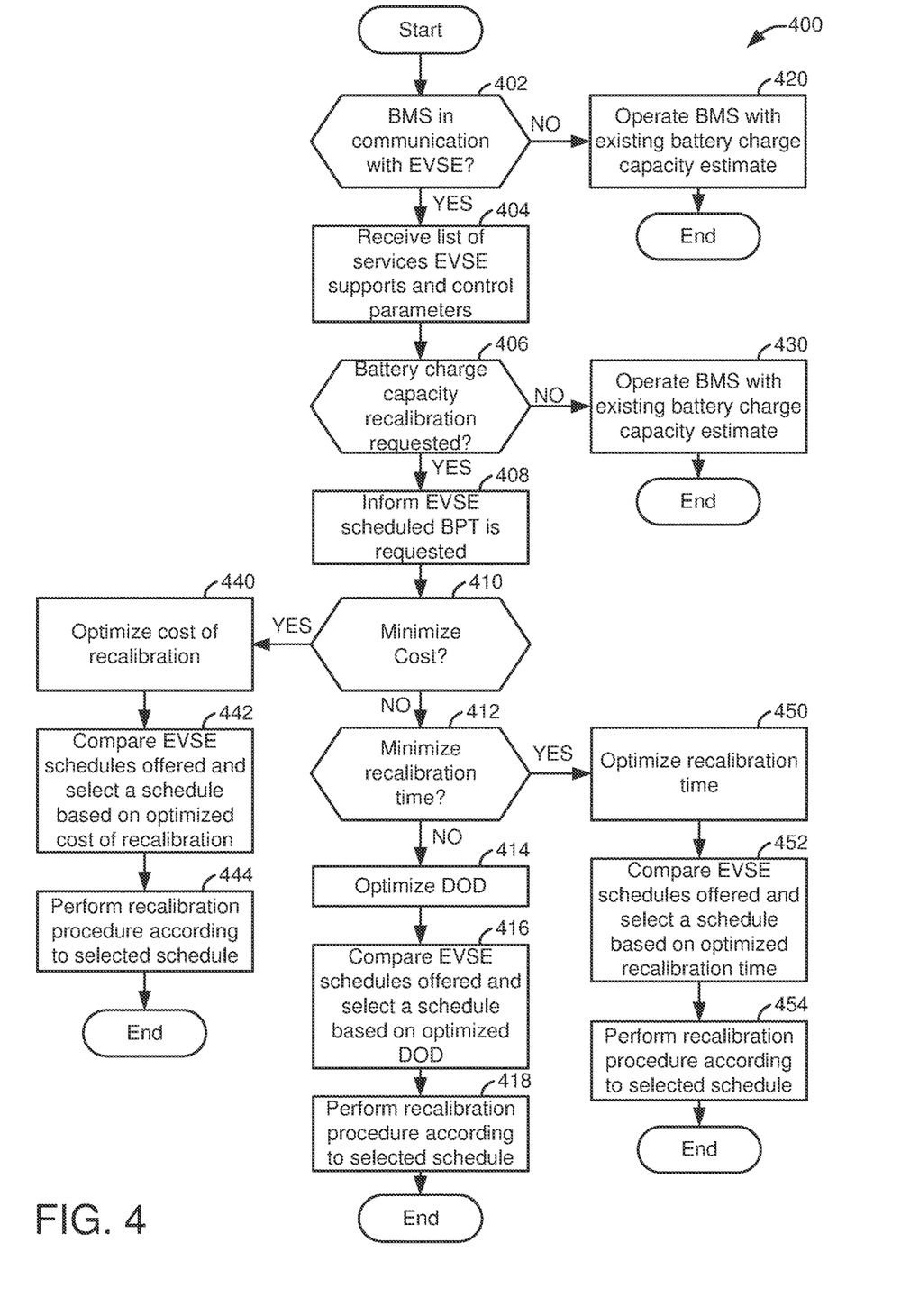
FIG. 4 shows a flowchart of a method for recalibrating a traction battery electric charge capacity value.

The following description relates to systems and methods for recalibrating a traction battery electric charge capacity value. The traction battery electric charge capacity value may be a basis for estimating vehicle driving range, traction battery state of charge, and traction battery health. The traction battery may be included in an electric vehicle as shown in FIG. 1 or a hybrid vehicle. The traction battery may be charged and discharged via electric vehicle supply equipment that includes capabilities of DC charging/discharging, AC charging/discharging, and wireless charging/discharging as shown in FIG. 2. Example data shared between a battery management system (BMS) of a vehicle and an EVSE during initial communications is shown in FIG. 3. A method for recalibrating a traction battery electric charge capacity value is shown in FIG. 4.

A traction or propulsion battery may supply electric power to and receive electric power from an electric machine that propels a vehicle. The traction battery may degrade as a vehicle is used and as in service time increases such that the traction battery may lose some if its charge storage capacity. For example, a new traction battery may have a capacity of 600 ampere-hours when new, but the traction battery may have a capacity of 530 ampere-hours after the vehicle has been used for a period of time. The traction battery's energy capacity may be determined from the battery's voltage and the battery's charge capacity. The traction battery's charge capacity value may be updated from time to time as the battery is charged and discharged. However, a traction battery in a vehicle may have a large capacity and only a small fraction of that capacity may be utilized when the vehicle is driven during short daily commutes. A battery capacity that is updated when the battery is discharged in relatively small amounts may not be as accurate as a battery capacity that is determined when the battery is discharged to a low level. Therefore, it may be desirable to provide a way of improving accuracy of battery charge estimates so that vehicle driving range and battery state of health estimates may be improved.

The inventors herein have recognized the above-mentioned issues and have developed a method for an electric energy storage device management system (EESDMS), comprising: receiving to the EESDMS from electric vehicle supply equipment (EVSE) a list of services that the EVSE supports; informing the EVSE via the EESDMS that scheduled bidirectional power transfer (BPT) is selected from the list of services that the EVSE supports; informing the EVSE via the EESDMS of the EESDMS's charging and discharging capabilities; receiving a list of supported discharging and charging schedules that are supported by the EVSE; and controlling discharging and charging of an electric energy storage device via the EESDMS according to one discharging and charging schedule included in the list of supported discharging and charging schedules.

By exchanging data between an EESDMS and an EVSE, it may be possible to provide a technical result of improving electric energy storage device capacity estimates. In particular, the exchange of data may allow for a greater depth of discharge for the electric energy storage device so that electric charge capacity estimates for the electric energy storage device may be improved. In addition, the data exchange may allow the EESDMS to optimize charging/discharging cost and timing.

The present description may provide several advantages. In particular, the approach may improve electric energy storage device charge capacity estimates for an electric energy storage device. Further, the approach may improve estimates of battery state of health and vehicle driving range. Further still, the approach may reduce cost of recalibrating electric energy storage device capacity values.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including front electric machine 125 and rear electric machine 126. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 has a front axle 133 and a rear axle 122. In some examples, rear axle may comprise two half shafts, for example first half shaft 122a, and second half shaft 122b. Likewise, front axle 133 may comprise a first half shaft 133*a* and a second half shaft 133*b*. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a low gear set 175 and a high gear 177 that are coupled to electric machine 126 via output shaft 126*a* of rear electric machine 126. Low gear 175 may be engaged via fully closing low gear clutch 176. High gear 177 may be engaged via fully closing high gear clutch 178. High gear clutch 178 and low gear clutch 176 may be opened and closed via commands received by controller 136*c* of rear drive unit 136 (e.g., rear drive unit controller 136*c*) over controller area network (CAN) 199. Alternatively, high gear clutch 178 and low gear clutch 176 may be opened and closed via digital outputs or pulse widths provided via control system 14. Rear drive unit 136 may include differential 128 so that torque may be provided to axle 122*a* and to axle 122*b*. In some examples, an electrically controlled differential clutch (not shown) may be included in rear drive unit 136.

The front axle 133 is coupled to electric machine 125. Front drive unit 137 may transfer power from electric machine 125 to axle 133 resulting in rotation of drive wheels 130. Front drive unit 137 may include a low gear set 170 and a high gear 173 that are coupled to electric machine 125 via output shaft 125*a* of front electric machine 125. Low gear 170 may be engaged via fully closing low gear clutch 171. High gear 173 may be engaged via fully closing high gear clutch 174. High gear clutch 174 and low gear clutch 171 may be opened and closed via commands received by controller 133*c* over CAN 199. Alternatively, high gear clutch 174 and low gear clutch 171 may be opened and closed via digital outputs or pulse widths provided via control system 14. Front drive unit 137 may include differential 127 so that torque may be provided to axle 133*a* and to axle 133*b*. In some examples, an electrically controlled differential clutch (not shown) may be included in rear drive unit 137.

Electric machines 125 and 126 may receive electrical power from onboard electrical energy storage device 132 (e.g., a traction or propulsion battery, capacitor, etc.). Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current generated by rear electric machine 126 to direct current for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 125, electric machine 126, energy storage device 132, etc. via CAN 199. Control system 14 may receive sensory feedback information from one or more of electric machine 125, electric machine 126, energy storage device 132, etc. Further, control system 14 may send control signals to one or more of electric machine 125, electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a propulsive effort pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as electric vehicle supply equipment (EVSE) 12, which may be electrically coupled to a stationary power grid 5, where the EVSE 12 and the power grid 5 reside external to the vehicle (e.g., not part of the vehicle). As a non-limiting example, vehicle propulsion system 100 may be configured as a plug-in electric vehicle (EV), whereby electrical energy may be supplied to energy storage device 132 via the EVSE 12. The EVSE 12 may communicate with the electric energy storage device management system (EESDMS) 139 via communications network 198. For example, the EVSE 12 and the EESDMS 139 may exchange charging and discharging limits, electric power costs, and schedules via communications network 198.

Electric energy storage device 132 includes an EESDMS 139 and a power distribution module 138. EESDMS 139 may control charging and discharging of electric energy storage device 132 as well as balancing between electric energy storage elements (e.g., battery cells), battery usage estimates, state of charge estimates, state of health estimates, and electric energy storage device charge capacity estimates. In some examples, the EESDMS may be referred to as a battery management system (BMS). EESDMS 139 may communicate with other vehicle controllers (e.g., controller 12) and EVSE 12 via CAN 199 and/or other communication networks 13. EESDMS 139 may monitor battery current, battery voltage, and battery temperature via battery sensors 10. EESDMS 139 includes non-transitory (e.g., read only memory) 139*a*, random access memory 139*b*, digital inputs/outputs 139*d*, and a microcontroller 139*c*. Power distribution module 138 may control flow of power into and out of electric energy storage device 132. EVSE 12 may be coupled to vehicle via receptacle port 10.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 125, electric machine 126, wheel speed sensor 195, etc., may communicate information to controller 12, regarding various states of electric machine operation. Controller 12 includes non-transitory (e.g., read only memory) 165, random access memory 166, digital inputs/outputs 168, and a microcontroller 167. Controller 12 may also perform calculations and tasks that may be performed via electric energy storage device controller 139.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include a human/machine interface 15 via which the vehicle operator may adjust the operating status of the vehicle. Specifically, the human/machine interface 15 may be configured to initiate and/or terminate operation of the vehicle driveline (e.g., electric machine 125 and electric machine 126) based on an operator input. Various examples of the human/machine interface 15 may include interfaces that require a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the human/machine interface 15. The passive key may be configured as an electronic key fob or a smart key that does not have to be inserted or removed from the human/machine interface 15 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the vehicle's propulsion motor (e.g., 125 and/or 126). The devices included in dashboard 19 may communicate with controller 12 and EESDMS 139 via CAN 199.

The system of FIG. 1 provides for a vehicle system, comprising: a traction battery; a battery management system (BMS) including a controller with executable instructions stored in non-transitory memory that cause the controller to receive to the BMS from the electric vehicle supply equipment (EVSE), a list of services that the EVSE supports, additional instructions that cause the controller inform the EVSE that scheduled bidirectional power transfer (BPT) is selected from the list of services that the EVSE supports, additional instructions that cause the controller to inform the EVSE of the traction battery's charging and discharging capabilities; additional instructions that cause the controller to receive a list of supported discharging and charging schedules that are supported by the EVSE; and additional instructions that cause the controller to control discharging and charging of the traction battery via the BMS according to one discharging and charging schedule included in the list of supported discharging and charging schedules.

The vehicle system further comprises additional instructions to recalibrate a charge capacity value of the traction battery as part of a process of controlling discharging and charging of the traction battery. The vehicle system further comprises additional instructions to select the one discharging and charging schedule based on minimizing cost to recalibrate the charge capacity value. The vehicle system further comprises additional instructions to select the one discharging and charging schedule based on minimizing time to recalibrate the charge capacity value. The vehicle system further comprises additional instructions to select the one discharging and charging schedule based on maximizing depth of discharge when recalibrating the charge capacity value. The vehicle system includes where the BPT is direct current BPT. The vehicle system includes where the BPT is alternating current BPT. The vehicle system includes where the BPT is wireless BPT.

Referring now to FIG. 2, a schematic view of example EVSE 12 is shown. The EVSE 12 may include systems and/or components to support direct current (DC) charging and discharging, alternating current (AC) charging and discharging, and wireless charging and discharging. The EVSE 12 may be incorporated into a residential dwelling, a commercial facility, or at other locations.

In one example, EVSE 12 may receive electric power from a stationary electric power grid 5. EVSE 12 may also supply electric power to stationary electric power grid 5. Thus, EVSE 12 may be a bi-directional power control device. EVSE 12 may receive AC electric power from grid 5.

In some examples, EVSE 12 may transfer electric power via wireless power coupling 202. Wireless power coupling 202 may include an inductor 203 for generating an electric field via which electric power may be transferred to electric energy storage device 132 (not shown) by way of power distribution module 138. An inductor 240 included in vehicle 121 may receive electric power that is transmitted via EVSE 12.

EVSE 12 may also include an AC to AC converter 204 that may supply AC power to power distribution module 138 and electric energy storage device 132 (not shown). Specifically, the AC converter 204 may step down a voltage from grid 5 and supply lower voltage AC power to power distribution module 138. The power distribution module 138 may rectify the AC power and store DC power to electric energy storage device 132 (not shown). The AC to AC converter 204 may also receive AC power from power distribution module 138 and boost the voltage of the AC power to supply AC power to grid 5.

EVSE 12 may also include an AC to DC converter 206 that may supply DC power to power distribution module 138 and electric energy storage device 132 (not shown). The AC power may be rectified and stepped down in voltage before power distribution module 138 receives the DC power. Alternatively, power distribution module 138 may supply DC power to converter 206. Converter 206 may convert the DC power to AC power that is supplied to grid 5.

EVSE 12 may also include a communications controller 208 that communicates digitally with EESDMS 139 (shown in FIG. 1) via communications network 198 and power distribution module 138. EVSE 12 and EESDMS 139 may exchange schedules, charging and discharging limits, charging and discharging cost data, etc.

In this way, an EVSE 12 may supply electric power to an electric energy storage device 132 (shown in FIG. 1) via different power distribution paths. Further, EVSE 12 may receive electric power from the electric energy storage device 132 via the power distribution paths.

Referring now to FIG. 3, a graphic representation of an example communications handshaking sequence between an EVSE 12 and EESDMS 139 is shown. In one example, when EVSE 12 is within a predetermined distance of vehicle 121, or alternatively, when EVSE 12 is electrically coupled to vehicle 121, EVSE 12 may transmit a list of services 302 that are supported by the EVSE 12 to the EESDMS 139. The list of services may include, but is not limited to wireless charging and discharging, AC charging and discharging, and DC charging and discharging. The EESDMS 139 may respond by selecting one of the offered services 304. In addition, the EESDMS 139 may inform the EVSE 12 of the electric energy storage device's charging and discharging capabilities (e.g., a discharging capability of 40 kilowatt-hours and a charging capability of 30 kilowatt-hours based on the present operating state of the electric energy storage device). Further, the EESDMS 139 may inform the EVSE 12 of a desired or expected vehicle departure time from the vicinity of the EVSE 12.

The EVSE 12 may communicate a list of supported charging/discharging schedules 306 to the EESDMS 139. The list may include one or more proposed schedules 307. The information that is included in the one or more schedules 307 may include but is not limited to a time interval (k), $P_{min}^c(k)$ a minimum charge power during time interval k, $P_{max}^c(k)$ a maximum charge power during time interval k, $price^c(k)$ a unit charging cost during interval k, $P_{min}^D(k)$ a minimum discharge power during time interval k, $P_{Max}^D(k)$ a maximum discharge power during time interval k, and $price^D(k)$ a unit discharge cost during the time interval k. The EESDMS 139 may communicate the selected charging/discharging schedule 310 to the EVSE 12.

In this way, a charging and/or discharging schedule may be negotiated between the EVSE 12 and the EESDMS 139. The EESDMS 139 may control the charging and discharging of the electric energy storage device 132 according to the negotiated schedule.

Referring now to FIG. 4, an example method for recalibrating a traction battery electric charge capacity value is shown. The method of FIG. 4 may be incorporated into and may cooperate with the system of FIG. 1. Further, at least portions of the method of FIG. 4 may be incorporated as executable instructions stored in non-transitory memory of a controller while other portions of the method may be performed via the controller transforming operating states of devices and actuators in the physical world. In one example, method 400 may be stored in non-transitory memory of EESDMS 139.

At 402, method 400 judges whether or not the battery management system (BMS), or alternatively, the EESDMS is communicating with the EVSE. The BMS or EESDMS may begin to communicate (e.g., exchange control parameters and data) with the EVSE when the vehicle is within a threshold distance of the EVSE. Alternatively, the BMS or EESDMS may begin communicating with the EVSE when an electrical coupling between the BMS and the EESDMS is present. If method 400 judges that the BMS or EESDMS is communicating with the EVSE, the answer is yes and method 400 proceeds to 404. Otherwise, the answer is no and method 400 proceeds to 420.

At 420, method 400 operates the BMS, or alternatively, the EESDMS, with an existing value of the electric energy storage device's electric charge capacity. The existing value may be stored in controller memory and the existing value may be set to a predetermined value when the electric energy storage device is manufactured. The value of the electric energy storage device's electric charge capacity may be adjusted or revised from time to time via a recalibration process according to vehicle operating conditions and input to a human/machine interface. The existing value of the electric energy storage device's electric charge capacity may be applied to determine a state of health of the electric energy storage device, a state of charge of the electric energy storage device, and a travel range for a vehicle. Method 400 proceeds to exit.

At 404, method 400 receives a list of services that are communicated by and supported by the EVSE. The services may include, but are not limited to wireless charging and discharging, AC charging and discharging, and DC charging and discharging. Method 400 may also receive various charging and discharging control parameters from the EVSE. In one example, method 400 may receive a time interval (k), $P_{min}^c(k)$ a minimum charge power during time interval k, $P_{max}^c(k)$ a maximum charge power during time interval k, $price^c(k)$ a unit charging cost during interval k, $P_{min}^D(k)$ a minimum discharge power during time interval k, $P_{Max}^D(k)$ a maximum discharge power during time interval k, and $price^D(k)$ a unit discharge cost during the time interval k. Method 400 proceeds to 406.

At 406, method 400 judges if battery or electric energy storage device electric charge capacity recalibration is requested. Electric energy storage device electric charge capacity recalibration may be requested via a human inputting a request to a human/machine interface, when a vehicle travels a predetermined distance, when the electric energy storage device electric charge capacity recalibration has not occurred within a predetermined amount of time, or based on an actual total number of electric energy device charging and discharging cycles. If method 400 judges that electric energy storage device electric charge capacity recalibration is requested, the answer is yes and method 400 proceeds to 408. Otherwise, the answer is no and method 400 proceeds to 430.

At 430, method 400 operates the BMS, or alternatively, the EESDMS, with an existing value of the electric energy storage device's electric charge capacity. The existing value of the electric energy storage device's electric charge capacity may be applied to determine a state of health of the electric energy storage device, a state of charge of the electric energy storage device, and a travel range for a vehicle. Method 400 proceeds to exit.

At 408, method 400 communicates to the EVSE that a scheduled bi-directional power transfer (BPT) is requested. The scheduled BPT allows the electric vehicle to choose one of a group of energy transfer schedules that the EVSE offers to the BMS or EESDMS. The BMS or EESDMS controls energy transfer between the traction battery or electric energy storage device and the EVSE subject to a selected schedule that is provided by the EVSE. Method 400 may also communicate to the EVSE battery or energy storage device charging and discharging capabilities. Further, method 400 may communicate a requested departure time (e.g., a time that the electric vehicle will move from the area of the EVSE) to the EVSE. Method 400 proceeds to 410.

At 410, method 400 judges whether or not to minimize the cost of recalibrating the electric energy storage device electric charge capacity value. In one example, a human user may request to minimize the cost of recalibration via providing input to a human/machine interface. Alternatively, a controller in the vehicle or an external controller (e.g., a controller at a service center) may request minimizing cost of recalibration. If method 400 judges that cost of recalibration of the electric energy storage device electric charge capacity value is requested, the answer is yes and method 400 proceeds to 440. Otherwise, the answer is no and method 400 proceeds to 412.

At 440, method 400 solves the following equation to optimize cost reduction of recalibrating the electric energy storage device electric charge capacity value:

$$Recalcost = \min\left(-\sum_{k=1}^{k=k_1} P(k) \times price^D(k) + \sum_{k=k_2}^{k=N} P(k) \times price^C(k)\right)$$

Subject to:

$$k_2 \geq k_1 + 1$$

$$P_{min}^D(k) \leq P(k) \leq \min\left(P_{max}^D(k), P_{EV_{max}}^D\right), \text{ for } k_1 \geq k \geq 1$$

$$P(k) = 0, \text{ for } k_1 + 1 > k > k_2$$

$$P_{min}^C(k) \leq P(k) \leq \min\left(P_{max}^C(k), P_{EV_{max}}^C\right), \text{ for } N \geq k \geq k_2$$

$$\sum_{k=k_1+1}^{k=N} P(k) = DOD_{target} \times Cap$$

$$E_{initial} - \sum_{k=1}^{k=k_1} P(k) + \sum_{k=k_1+1}^{k=N} P(k) = E_{target}$$

where $P(k)$ is the battery charging/discharging rate at time step k; $P_{EV_{max}}^D$ is the battery's discharging limit; $P_{EV_{max}}^C$ is the battery's charging limit; $E_{initial}$ is the initial energy that is stored in the battery; $E_{target}$ is the target energy to be stored in the battery; N is the total session time (e.g., departure time from the EVSE minus the session starting time); $DOD_{target}$ is the depth of discharge target for the battery (e.g., how low of a level that the battery is discharged to) requested via a vehicle owner/operator; Cap is the battery pack charge capacity. Values of the parameters may be retrieved from controller memory and/or input via a vehicle human occupant. The above optimization is solved for all battery charging/discharging schedules provided by the EVSE. The optimization outputs values for each battery charging/discharging schedule that is output by the EVSE. Method 400 proceeds to 442.

At 442, method 400 selects the schedule that minimizes cost. For example, if the EVSE provides four schedules, conditions or parameters in each of the four schedules are used to solve the optimization problem described at 440 four times, one for each schedule. If schedule number three results in a lowest charging cost, then schedule number three is selected. Method 400 notifies the EVSE of the selected schedule. Method 400 proceeds to 444.

At 444, method 400 discharges and charges the battery. In particular, the result of solving the optimization at 440 is a battery charging/discharging schedule based on EVSE and vehicle control parameters. After the EVSE schedule is selected at 442, the charging/discharging schedule determined at 440 that is based on the schedule selected at 442 is applied to charge and discharge the battery. Method 400 adjusts the traction battery's electric charge capacity value to the newly determined traction battery electric charge capacity value. In one example, the traction battery's electric charge capacity may be adjusted by first discharging the battery to a lower SOC. After the battery is discharged, a waiting period of time is allowed to expire before further operations are performed. After the waiting period has expired, the starting battery open circuit voltage (OCV start) is determined to establish an accurate SOC before charging of the battery begins. The battery is charged to a target or desired SOC while the amount of charge entering the battery in ampere-hours is monitored and recorded to memory. Another waiting period is allowed to expire and an ending OCV (OCV_end) is measured after the waiting period of time ends. The change in SOC (ΔSOC) is determined by subtracting SOC_start from SOC_end. The battery charge capacity is estimated by the following equation, which can be saved to the controller ROM for future battery control:

$$\Delta SOC = \frac{\int I dt}{CAP}$$

where I is the current entering the battery during battery charging and CAP is the newly estimated traction battery's electric charge capacity value. Controller memory is revised with the new value of CAP. Method 400 proceeds to exit.

At 412, method 400 judges whether or not to minimize the recalibration time (e.g., an amount of time used for the recalibration procedure) for determining the electric energy storage device electric charge capacity value. In one example, a human user may request to minimize the recalibration time via providing input to a human/machine interface. Alternatively, a controller in the vehicle or an external controller (e.g., a controller at a service center) may request minimizing recalibration time. If method 400 judges that minimizing recalibration time of the electric energy storage device electric charge capacity value is requested, the answer is yes and method 400 proceeds to 450. Otherwise, the answer is no and method 400 proceeds to 414.

At 450, method 400 solves the following equation to optimize reducing recalibration time of the electric energy storage device electric charge capacity value:

$$P(k) = \min\left(P_{max}^D(k), P_{EV_{max}}^D\right), \text{ for } k_1 \geq k \geq 1$$

$$P(k) = \min\left(P_{max}^C(k), P_{EV_{max}}^C\right), \text{ for } N \geq k_1 + 1$$

$$\sum_{k=k_1+1}^{k=N} P(k) = DOD_{target} \times Cap$$

$$E_{initial} - \sum_{k=1}^{k=k_1} P(k) + \sum_{k=k_1+1}^{k=N} P(k) = E_{target}$$

where the parameters are as previously described. Values of the parameters may be retrieved from controller memory and/or input via a vehicle human occupant. Method 400 proceeds to 452.

At 452, method 400 selects the schedule from 450 that minimizes the amount of time to charge/discharge the battery. For example, if the EVSE provides four schedules, conditions or parameters in each of the four schedules are used to solve the optimization problem described at 440 four times, one for each schedule. If schedule number two results in a lowest charging time, then schedule number two is selected. Method 400 notifies the EVSE of the selected schedule. Method 400 proceeds to 454.

At 454, method 400 discharges and charges the battery. In particular, the result of solving the optimization at 450 is a battery charging/discharging schedule based on EVSE and vehicle control parameters. After the EVSE schedule is selected at 452, the charging/discharging schedule determined at 450 that is based on the schedule selected at 452 is applied to charge and discharge the battery. Method 400 adjusts the traction battery's electric charge capacity value to the newly determined traction battery electric charge capacity value. Method 400 proceeds to exit.

At 414, method 400 optimizes the depth of discharge (DOD) of the battery. In one example, method 400 adjusts the $DOD_{target}$ value such that the total time needed to recalibrate the electric energy storage device electric charge capacity value according to the method at 450 is equal to the value of N. If the $DOD_{target}$ value is already equal to the target state of charge (SOC) minus a minimum SOC for the battery and the total time according to the method described at 450 is smaller than the value of N, the $DOD_{target}$ value is set to a target SOC for the battery minus a minimum SOC for the battery and cost of recalibration is minimized as described at 440. This procedure may optimize the DOD. Method 400 proceeds to 416.

At 416, method 400 selects the schedule from 414 that maximizes DOD. For example, if the EVSE provides four schedules, conditions or parameters in each of the four schedules are used to solve the optimization problem described at 414 four times, one for each schedule. If schedule number one results in a greatest DOD, then schedule number one is selected. Method 400 notifies the EVSE of the selected schedule. Method 400 proceeds to 418.

At 418, method 400 discharges and charges the battery. In particular, the result of solving the optimization at 414 is a battery charging/discharging schedule based on EVSE and vehicle control parameters. After the EVSE schedule is selected at 416, the charging/discharging schedule determined at 414 that is based on the schedule selected at 416 is applied to charge and discharge the battery. Method 400 adjusts the traction battery's electric charge capacity value to the newly determined traction battery electric charge capacity value. Method 400 proceeds to exit.

Thus, the method of FIG. 4 provides for a method an electric energy storage device management system (EESDMS), comprising: controlling discharging and charging of the electric energy storage device via the EESDMS according to one discharging and charging schedule included in a list of supported discharging and charging schedules generated via electric vehicle supply equipment (EVSE). The method further comprises: receiving to the EESDMS from the EVSE the list of services that the EVSE supports; and informing the EVSE via the EESDMS that scheduled bidirectional power transfer (BPT) is selected from the list of services that the EVSE supports. The method includes where the electric energy storage device is a battery and further comprising informing the EVSE via the EESDMS of an electric energy storage device's charging and discharging capabilities. The method further comprises receiving a list of supported discharging and charging schedules that are supported by the EVSE. The method includes where the BPT is wireless BPT or alternating current (AC) BPT. The method includes where the one discharging and charging schedule is selected via a human/machine interface, and where the BPT is direct current (DC) BPT. The method further comprises informing the EVSE of a requested vehicle departure time from an area of the EVSE.

The method of FIG. 4 also provides for a method an electric energy storage device management system (EESDMS), comprising: receiving to the EESDMS from electric vehicle supply equipment (EVSE) a list of services that the EVSE supports; informing the EVSE via the EESDMS that scheduled bidirectional power transfer (BPT) is selected from the list of services that the EVSE supports; informing the EVSE via the EESDMS of an electric energy storage device's charging and discharging capabilities; receiving a list of supported discharging and charging schedules that are supported by the EVSE; controlling discharging and charging of an electric energy storage device via the EESDMS according to one discharging and charging schedule included in the list of supported discharging and charging schedules; and recalibrating a charge capacity value of the traction battery during a time period in which discharging and charging of the traction battery is controlled. The method includes where the recalibrating is performed responsive to input to a human/machine interface. The method includes where the recalibrating is performed responsive to vehicle operating conditions. The method further comprises selecting the one discharging and charging schedule based on minimizing a cost to recalibrate the charge capacity value. The method further comprises selecting the one discharging and charging schedule based on minimizing time to recalibrate the charge capacity value.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to full electric vehicles and plug-in hybrid vehicles. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an electric energy storage device management system (EESDMS) of a vehicle, comprising:
controlling discharging and charging of an electric energy storage device of the vehicle via the EESDMS according to one discharging and charging schedule included in a list of supported discharging and charging schedules generated via electric vehicle supply equipment (EVSE) and communicated to the EESDMS via the EVSE in response to a request to recalibrate a charge capacity value of the electric energy storage device, the EVSE external from the vehicle, where the one discharging and charging schedule is selected via a human/machine interface; and
evaluating discharging and charging schedules via the EESDMS based on a target energy to be stored in the electric energy storage device, a depth of discharge of the electric energy storage device, a charge capacity of the electric energy storage device, and an initial energy stored in the electric energy storage device.

2. The method of claim 1, further comprising:
receiving to the EESDMS from the EVSE the list of supported discharging and charging schedules generated via the EVSE; and
informing the EVSE via the EESDMS that scheduled bidirectional power transfer (BPT) is selected from the list of supported discharging and charging schedules generated via the EVSE.

3. The method of claim 2, where the electric energy storage device is a battery, and further comprising:
informing the EVSE via the EESDMS of the electric energy storage device's charging and discharging capabilities.

4. The method of claim 3, further comprising receiving a list of supported discharging and charging schedules that are supported by the EVSE.

5. The method of claim 4, where the BPT is wireless BPT or alternating current (AC) BPT.

6. The method of claim 1, further comprising informing the EVSE of a requested vehicle departure time from an area of the EVSE.

7. A vehicle system, comprising:
a traction battery; and
a battery management system (BMS) of a vehicle including a controller with executable instructions stored in non-transitory memory that cause the controller to control discharging and charging of the traction battery via the BMS according to one discharging and charging schedule included in a list of supported discharging and charging schedules generated via electric vehicle supply equipment (EVSE) and communicated to the BMS via the EVSE in response to a request to recalibrate a charge capacity value of the traction battery and a request to minimize an amount of time to recalibrate the charge capacity value of the traction battery, the EVSE external from the vehicle, and additional executable instructions to recalibrate the charge capacity value of the traction battery as part of a process of controlling discharging and charging of the traction battery including minimizing an amount of time to minimize the amount of time to recalibrate the charge capacity value of the traction battery based on a target energy to be stored in the traction battery, a depth of discharge of the traction battery, a charge capacity of the traction battery, and an initial energy stored in the traction battery.

8. The vehicle system of claim 7, further comprising additional executable instructions to select the one discharging and charging schedule based on minimizing cost to recalibrate the charge capacity value.

9. The vehicle system of claim 7, further comprising additional executable instructions to select the one discharging and charging schedule based on minimizing time to recalibrate the charge capacity value.

10. The vehicle system of claim 7, further comprising additional executable instructions to select the one discharging and charging schedule based on maximizing depth of discharge when recalibrating the charge capacity value.

11. The vehicle system of claim 7, further comprising additional executable instructions that cause the controller to receive to the BMS from the EVSE, a list of services that the EVSE supports, additional executable instructions that cause the controller to inform the EVSE that scheduled bidirectional power transfer (BPT) is selected from the list of services that the EVSE supports, and additional executable instructions that cause the controller to inform the EVSE of the traction battery's charging and discharging capabilities.

12. The vehicle system of claim 11, where the BPT is direct current or alternating current BPT, and further comprising:
additional executable instructions that cause the controller to receive a list of supported discharging and charging schedules that are supported by the EVSE.

13. The vehicle system of claim 11, where the BPT is wireless BPT.

14. A method for an electric energy storage device management system (EESDMS) of a vehicle, comprising:
during a first condition, selecting a discharging and charging schedule for a battery according to a time to recalibrate a charge capacity, the time to recalibrate the charge capacity based on a depth to discharge target, an initial energy stored in the battery, a battery discharge limit, a battery pack charge capacity, and a battery charge limit;
controlling discharging and charging of the battery via the EESDMS according to the discharging and charging schedule included in a list of supported discharging and charging schedules generated via electric vehicle supply equipment (EVSE) and communicated to the EESDMS via the EVSE, the EVSE external from the vehicle; and recalibrating a charge capacity value of the battery during a time period in which discharging and charging of the battery is controlled.

15. The method of claim 14, where the recalibrating is performed responsive to input to a human/machine interface.

16. The method of claim 14, where the recalibrating is performed responsive to vehicle operating conditions, and further comprising:

receiving to the EESDMS from the EVSE a list of services that the EVSE supports;

informing the EVSE via the EESDMS that scheduled bidirectional power transfer (BPT) is selected from the list of services that the EVSE supports;

informing the EVSE via the EESDMS of the battery's charging and discharging capabilities; and receiving a list of supported discharging and charging schedules that are supported by the EVSE.

17. The method of claim 14, further comprising:

during a second condition, selecting a discharging and charging schedule according to a cost to recalibrate the charge capacity value, the cost to recalibrate the charge capacity based on the depth to discharge target, the initial energy stored in the battery, the battery discharge limit, the battery pack charge capacity, and the battery charge limit.

* * * * *